US012109168B2

(12) United States Patent
Hooworth et al.

(10) Patent No.: US 12,109,168 B2
(45) Date of Patent: Oct. 8, 2024

(54) FOLDING ROLLATOR

(71) Applicant: INNOVESO PTY LTD, Caulfield (AU)

(72) Inventors: Allan James Hooworth, Burwood (AU); Jon Graham Seddon, Burwood (AU)

(73) Assignee: INNOVESO PTY, LTD., Caulfield (AU)

(*) Notice: Subject to any disclaimer, the term of this patent is extended or adjusted under 35 U.S.C. 154(b) by 73 days.

(21) Appl. No.: 17/786,838

(22) PCT Filed: Dec. 18, 2020

(86) PCT No.: PCT/AU2020/000141
§ 371 (c)(1),
(2) Date: Jun. 17, 2022

(87) PCT Pub. No.: WO2021/119723
PCT Pub. Date: Jun. 24, 2021

(65) Prior Publication Data
US 2023/0028131 A1 Jan. 26, 2023

(30) Foreign Application Priority Data
Dec. 19, 2019 (AU) ................................ 2019904820

(51) Int. Cl.
*A61G 5/08* (2006.01)
*A61H 3/04* (2006.01)

(52) U.S. Cl.
CPC ................. *A61H 3/04* (2013.01); *A61G 5/08* (2013.01); *A61G 5/0808* (2016.11); (Continued)

(58) Field of Classification Search
CPC .............. A61H 3/04; A61H 2201/0161; A61H 2201/1633; A61H 2201/1635
(Continued)

(56) References Cited

U.S. PATENT DOCUMENTS 4,648,619 A * 3/1987 Jungnell .............. A61G 5/0825 297/378.12
4,907,794 A * 3/1990 Rose ........................ A61H 3/04 280/43.24

(Continued)

FOREIGN PATENT DOCUMENTS

CN 202822023 U 3/2013
DE 4328875 C1 2/1995

(Continued)

OTHER PUBLICATIONS

Australian Examination Report dated May 3, 2021.

(Continued)

*Primary Examiner* — Robert Canfield
(74) *Attorney, Agent, or Firm* — Tarolli, Sundheim, Covell & Tummino LLP

(57) ABSTRACT

A rollator to aid mobility is described. The rollator comprises an A-frame with two pairs of uprights, each pair of uprights connected by at least one respective hinge to allow each pair of uprights to be folded or pivot front-to-back and a seat disposed between the two pairs of uprights, the seat foldable side-to-side. To fold compactly the rollator comprises an X-shaped cross-linkage comprising four linkage members. A method of manufacturing the rollator is also disclosed. The four linkage members may extend from a respective upright to a central hub underneath the seat. The cross-linkage may fold or pivot at the central hub in both front-to back and side-to-side dimensions when the rollator is folded away.

18 Claims, 12 Drawing Sheets

(52) U.S. Cl.
CPC .......... *A61G 5/0816* (2016.11); *A61G 5/0825* (2016.11); *A61G 5/0833* (2016.11); *A61G 5/0841* (2016.11); *A61H 2003/046* (2013.01); *A61H 2201/0161* (2013.01); *A61H 2201/1633* (2013.01)

(58) Field of Classification Search
USPC .......................................................... 297/5, 6
See application file for complete search history.

(56) References Cited

U.S. PATENT DOCUMENTS

| | | | | | |
|---|---|---|---|---|---|
| 4,934,722 | A * | 6/1990 | Goetzelman | A61G 5/0825 280/250.1 |
| 5,016,720 | A * | 5/1991 | Coker | A61G 5/0825 74/105 |
| 8,333,208 | B2 | 12/2012 | Miller | |
| 9,662,264 | B2 * | 5/2017 | Jacobs | A61H 3/04 |
| 9,849,057 | B1 * | 12/2017 | Janeczek | A61G 5/0816 |
| 11,179,289 | B2 * | 11/2021 | Miller | A61H 3/04 |
| 11,197,289 | B2 | 12/2021 | Lee et al. | |
| 11,633,321 | B2 * | 4/2023 | Miller | A61H 3/04 280/650 |
| 11,779,506 | B1 * | 10/2023 | Liu | A61H 3/04 135/67 |
| 2007/0096436 | A1 * | 5/2007 | Willis | A61G 5/128 280/650 |
| 2014/0265188 | A1 * | 9/2014 | Chang | A61G 5/101 280/47.4 |
| 2017/0008544 | A1 * | 1/2017 | Kindberg | B62B 7/042 |
| 2020/0078257 | A1 * | 3/2020 | Miller | A61H 3/04 |
| 2022/0110818 | A1 * | 4/2022 | Orrell-Jones | A61G 5/0825 |
| 2022/0257450 | A1 * | 8/2022 | Whitmore | A61H 3/04 |

FOREIGN PATENT DOCUMENTS

| | | | | |
|---|---|---|---|---|
| JP | 3080949 | B1 | 8/2000 | |
| JP | 2001008990 | A | 1/2001 | |
| JP | 200643224 | A | 2/2006 | |
| WO | 2020/051518 | A1 | 3/2020 | |
| WO | WO-2021119723 | A1 * | 6/2021 | A61H 3/04 |

OTHER PUBLICATIONS

Applicant: Innoveso Pty Ltd; Australian National Application No. 2019904820; Filed Dec. 19, 2019; Australian Patent Office-International-Type Search Report; Nov. 6, 2020; 9 pgs.

Applicant: Innoveso Pty Ltd; International Application No. PCT/AU2020/000141; Filed Dec. 18, 2020; PCT International Search Report and Written Opinion; Jan. 27, 2021; 12 pgs.

* cited by examiner

FOLDING ROLLATOR

FIELD OF THE INVENTION

The present invention relates to a folding rollator. More particularly, this invention relates to a folding rollator which folds in two dimensions.

BACKGROUND TO THE INVENTION

The ageing process, or injury, can result in reduced mobility. A variety of mobility aids have been developed to maintain mobility and quality of life under these circumstances. Walkers and walking frames provide a supportive frame to assist with walking, rollators add wheels to the frame along with a built-in seat.

One such rollator is the X-fold rollator available from Independent Living Centres Australia (see https://ilcaustralia.org.au/products/19549). This four-wheeled rollator that folds in two directions. The "X" frame between the two uprights folds in one direction and the uprights fold in another direction relative to the respective elongate struts which have a wheel disposed on either end.

Chinese Utility Model No. 202822023 U to NINGBO HOMY REHABILITATION EQUIPMENT CO LTD discloses a four-wheel rollator which comprises an A frame, handrail pipe components, a backrest pipe component and a seat cushion. The front wheel components and rear wheel components have telescopic positioning sleeve rods with the front and rear wheels detachably fixed on the sleeve rods connected with the vehicle frame components. The four wheels can be disassembled, so that packing space is saved so that transportation and storage are convenient.

Chinese Utility Model No. 202961085U to WU JIQUN teaches an X-frame foldable rollator with a pair of upper brackets, a pair of lower brackets, a supporting seat, a folding mechanism and a pair of locking mechanisms. An inserting hole and a rotating groove are formed in the supporting seat. The upper brackets are inserted into the inserting hole and pivoted with the supporting seat. The folding mechanism comprises a pair of supporting rods and a pair of pivoting seats. The pivoting seats and the upper brackets are coaxially pivoted on the inner side of the supporting seat. The middle parts of the two supporting rods are pivoted crosswise, the upper ends of the two supporting rods are moveably connected to the upper brackets respectively and the lower ends of the two supporting rods are pivoted to the pivoting seats respectively. Each locking mechanism comprises a first connecting rod, a sliding sleeve and a buckling sleeve. The sliding sleeve is sleeved on each upper bracket in a sliding mode. One end of the first connecting rod is pivoted to each supporting rod and the other end of the first connecting rod is pivoted to each sliding sleeve and the buckling sleeve is sleeved on each upper bracket in a sliding mode and connected with the sliding sleeve.

DE 4328875 to GREGOR HORACEK describes a U-frame collapsible walking aid with front and rear struts arranged on both sides for the reception of front and rear wheels. The front strut in each case receives a sliding handle in the region of its end facing away from the associated front wheel and is pivotably connected to its associated rear strut, and there is at least one cross bracing arranged between struts on different sides of the walking aid. The cross bracing be designed as a folding mechanism in the form of a folding strut and/or pantograph.

U.S. Pat. No. 4,867,438 to JOHN and JESSIE M. STECKERT and teaches a U-shaped main frame with wheels for rolling engagement with the ground, and an upper handle portion is provided and is telescopingly received on the main frame, so as to be adjustable for the heights of various individuals. A second pivotal frame is connected to the main frame and is provided for ground support in cooperation with the wheels of the main frame.

U.S. Pat. No. 6,688,633 to MORE JOYFUL LIVING, LLC describes a stroller rollator for use when transporting elderly people and disabled people, comprising a U-frame provided with handle bars, the frame comprising a front and a rear frame section, each essentially consisting of a pair of frame bars or frame tubes with transverse connections, the frame bars or frame tubes having their lower ends designed for movement across the ground and the frame sections being foldably connected about a transverse axis that is located under handle bar level. The frame sections are also foldable in the transverse direction, due to the transverse connections between the frame tubes of the frame sections being formed by connecting bars which are adapted to be folded in or substantially in the plane of the respective frame section. The aid is adapted to be used both as a walking aid (rollator) and as a passive wheelchair.

U.S. Pat. No. 9,849,057 also to MORE JOYFUL LIVING, LLC teaches a rollator in which the spaced apart forward and rear legs fold in towards each other at hinges 114, 128 and in which the spaced apart sides fold inwardly at lateral hinges 118, 132 and intermediate hinge 152.

JP 3080949 to ZOJIRUSHI BABY KK teaches a rollator foldable in "forward and backward directions and right and left directions". Folding is by a pair of respective right and left front leg rods 3 and rear leg rods 5 which are extended to a generally vertical direction, a pair of horizontal rods 11 bridged between front leg rods 3 and the rear leg rods 5, two declined rods crossing between the right and left front leg rods 3 and two bottom rods bridged crossing between the front and rear leg rods 3, 5.

There remains a need for a rollator that folds compactly and easily, and which is sturdy enough to sit on for extended periods of time.

The reference to any prior art in this specification is not, and should not be taken as, an acknowledgement or any form of suggestion that the prior art forms part of the common general knowledge.

SUMMARY OF THE INVENTION

Generally, embodiments of the present invention relate to a folding rollator.

In a broad form, the invention relates to a folding rollator. In a particular embodiment the folding rollator folds in two dimensions.

In a first form, although it need not be the only or indeed the broadest form, the invention provides a rollator comprising:

an A-frame with two pairs of uprights, each pair of uprights connected by at least one respective hinge to allow each pair of uprights to be folded or pivot front-to-back; and a seat disposed between the two pairs of uprights, the seat foldable side-to-side.

In a second form, the invention provides a method of manufacturing a rollator comprising:

constructing an A-frame comprising two pairs of uprights, each pair of uprights connected by at least one respective hinge to allow each pair of uprights to be folded or pivot front-to-back; and disposing a seat between the two pairs of uprights, so that the seat is foldable side-to-side.

Advantageously, the rollator of the first and second forms provides a strong, stable and lightweight product which collapses to an exceptionally small fold package and which is much easier to manipulate than prior art devices. Of further significant advantage is that the seat is robust enough to support a user for an extended period of time.

According to one embodiment of any one of the above forms, the seat may comprise preferably a cross linkage. The cross linkage may comprise an X-shaped cross-linkage. The X-shaped cross-linkage may comprise four linkage members. Each of the four linkage members may extend from a respective upright to a central hub underneath the seat. The cross-linkage may fold or pivot at the central hub in both front-to back and side-to-side dimensions when the rollator is folded away. When the linkage members are disposed in the central hub they may be at or below centre.

In one embodiment of any one of the above forms, each pair of uprights may comprise a front upright and a rear upright. The A-frame may thereby comprise four uprights. The front uprights may be straight. The rear uprights may comprise an angled section. The angled section may provide an ergonomic shape.

According to one embodiment of any one of the above forms, the frame may further comprise one or more front struts. The one or more front struts may comprise cross-struts. The cross-struts may comprise two cross-struts. The two cross-struts may cross-over. The two or more cross-struts may cross-over or intersect at or near their mid-point. The two or more cross-struts may also fold or pivot relative to one another when the rollator folds so the frame folds side to side. The one or more front struts may be disposed on and extend between the two front uprights.

In another embodiment of any one of the above forms, the frame may further comprise one or more side struts. The one or more side struts may extend between a respective front upright and a respective rear upright. The one or more side struts may comprise a pair of side struts. The pair of side struts may support the seat.

In yet another embodiment of any one of the above forms, the hinges may comprise a pair of hinges, with a hinge of the pair disposed on each pair of uprights. Each hinge of the pair of hinges may operate to fold the rollator front to back. Each hinge of the pair of hinges may allow the front struts and/or side struts to slide along the uprights during folding.

The folding may be operated by an actuator. The actuator may comprise one or more release. The actuator release may be disposed on the rollator seat or rollator handle. The folding may be actuated by pulling or pushing the release. The pulling or pushing may be in one direction. When the release is operated the linkage members may be removed or partially removed from the central hub to allow folding. The removal or partial removal may comprise a lifting. The lifting may comprise lifting above centre. When the release is operated, the movement may allow one action folding.

According to any one of the above forms, the rollator frame may further comprise one or more stoppers. The one or more stoppers may be fixed on the frame to restrict movement of a folding component. The one or more stoppers may be positioned above or below the hinges. If the one or more stoppers are positioned below the hinges, the frame and/or front struts will only fold up. If the one or more stoppers are placed above hinges the frame and/or front struts would only fold down. When the one or more stoppers are positioned below the hinges 150, the stoppers provide additional structural support to the seat.

The rollator of any one of the above forms may also comprises wheels and handles. The wheels may comprise four wheels. The handles may comprise a pair of hand grips.

The rollator according to any one of the above forms may also comprise one or more brake. The one or more brake may be operated by a brake handle; brake lever; or brake button. The brake handle; brake lever or brake button may be disposed at or near the handles or at or near the wheels.

The rollator according to any one of the above forms may further comprise one or more storage components. The one or more storage components may be disposed on the handles, on the frame and/or under the seat.

Further aspects and/or features of the present invention will become apparent from the following detailed description.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein.

Figure 1A:
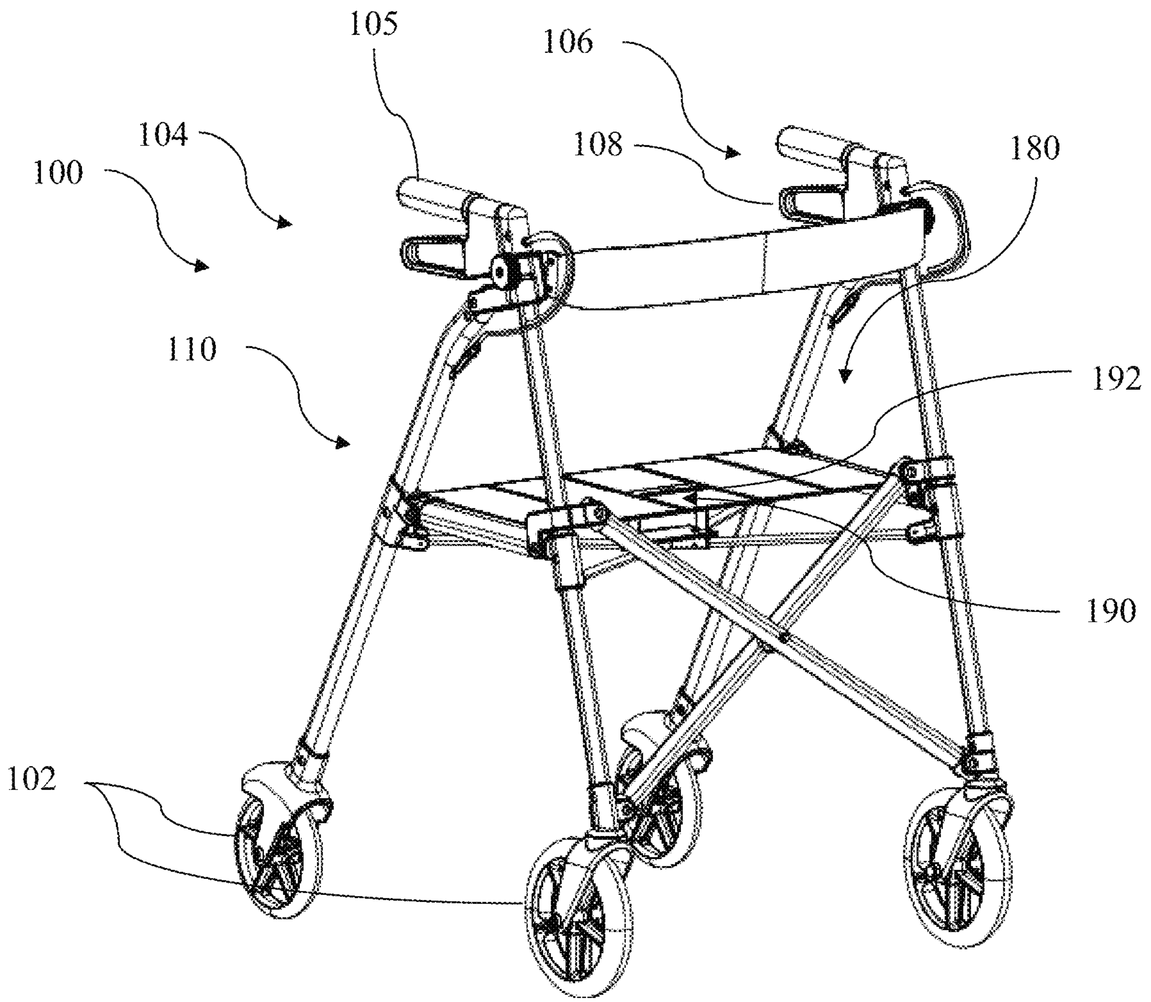
FIGS. 1A; 1B, 1C: shows a front perspective view; side perspective view; and a close-up view of a handle; of a rollator according to one embodiment of the invention.

Skilled addressees will appreciate that elements in the drawings are illustrated for simplicity and clarity and have not necessarily been drawn to scale. For example, the relative dimensions of some elements in the drawings may be distorted to help improve understanding of embodiments of the present invention.

DETAILED DESCRIPTION OF THE INVENTION

Embodiments of the present invention relate to a folding rollator. Advantageously, the folding rollator of the invention folds in two dimensions.

Although the term "fold" is used, it is understood that no bending may result and that instead there is pivoting or otherwise relative movement from an open or functional configuration to a "folded" or collapsed configuration. One purpose of this "folding" or "pivoting" or "relative movement" is to transition from a functional configuration where the rollator may be used as a mobility aid to a folded configuration that is more compact to aid storage and transport.

Figure 1B:
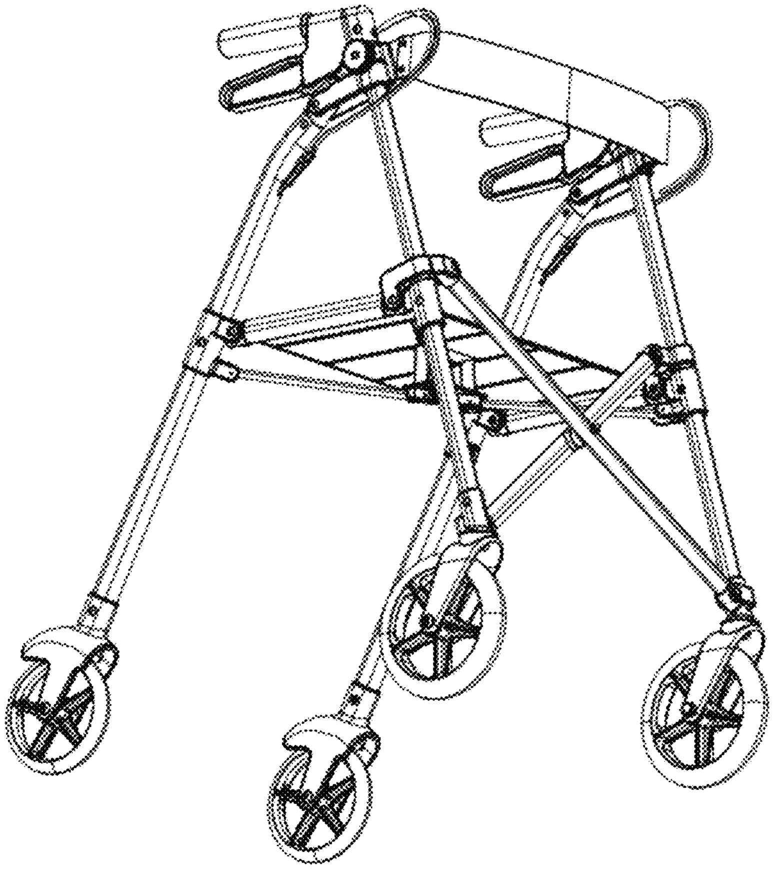
Figure 1C:
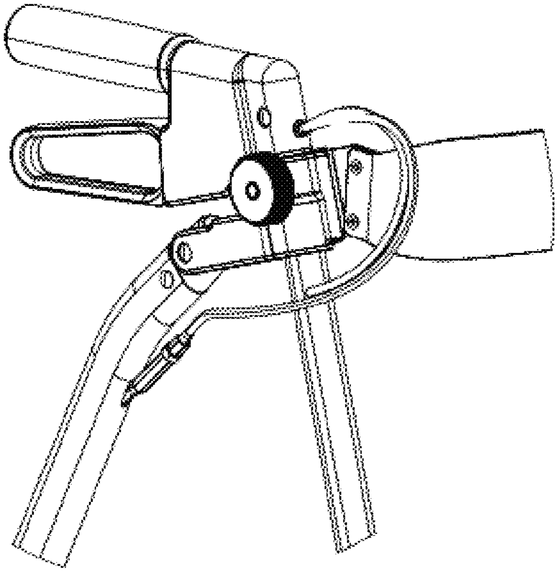

FIGS. 1 (1A; 1B; 1C); 2 (2A; 2B; 2C; 2D; 2E); and 3 (3A; 3B; 3C; 3D) show one embodiment of a rollator 100 according to the invention.

Rollator 100 comprises an A-frame 110 with two pairs of uprights 120, each pair of uprights 120 connected by at least one respective hinge 150 to allow each pair of uprights 120 to be folded or pivot front-to-back. Each pair of uprights comprise a front upright 122 and a rear upright 124. The A-frame 110 thereby comprise four uprights.

The rollator 100 shown in the Figures comprises a pair of hinges 150, with a hinge 150 of the pair disposed on each front upright 122. In other embodiments the hinges 150 may be disposed on rear uprights 124. Each hinge 150 of the pair of hinges 150 operates to fold the rollator 100. Each hinge 150 of the pair of hinges 150 allows the front struts 130 and/or side struts 140 to slide along the uprights 122, 124 during folding.

In the embodiment of rollator 100 shown in FIGS. 1; 2; and 3 the front uprights 122 are straight, while the rear uprights 124 comprise an angled section designed to provide an ergonomic shape.

Rollator 100 also comprises a seat 180 disposed between the two pairs of uprights 120. Advantageously, seat 180 is foldable side-to-side.

By providing rollator 100, which folds or pivots in both a front-to-back and side-to-side dimension, a strong, stable and lightweight product is provided which collapses to an exceptionally small fold package. Further advantages include that folding of rollator 100 is much easier to manipulate than prior art devices. Another significant advantage of rollator 100 is that the linkage which supports the seat 180 is robust enough to support a user for an extended period of time.

Figure 2A:
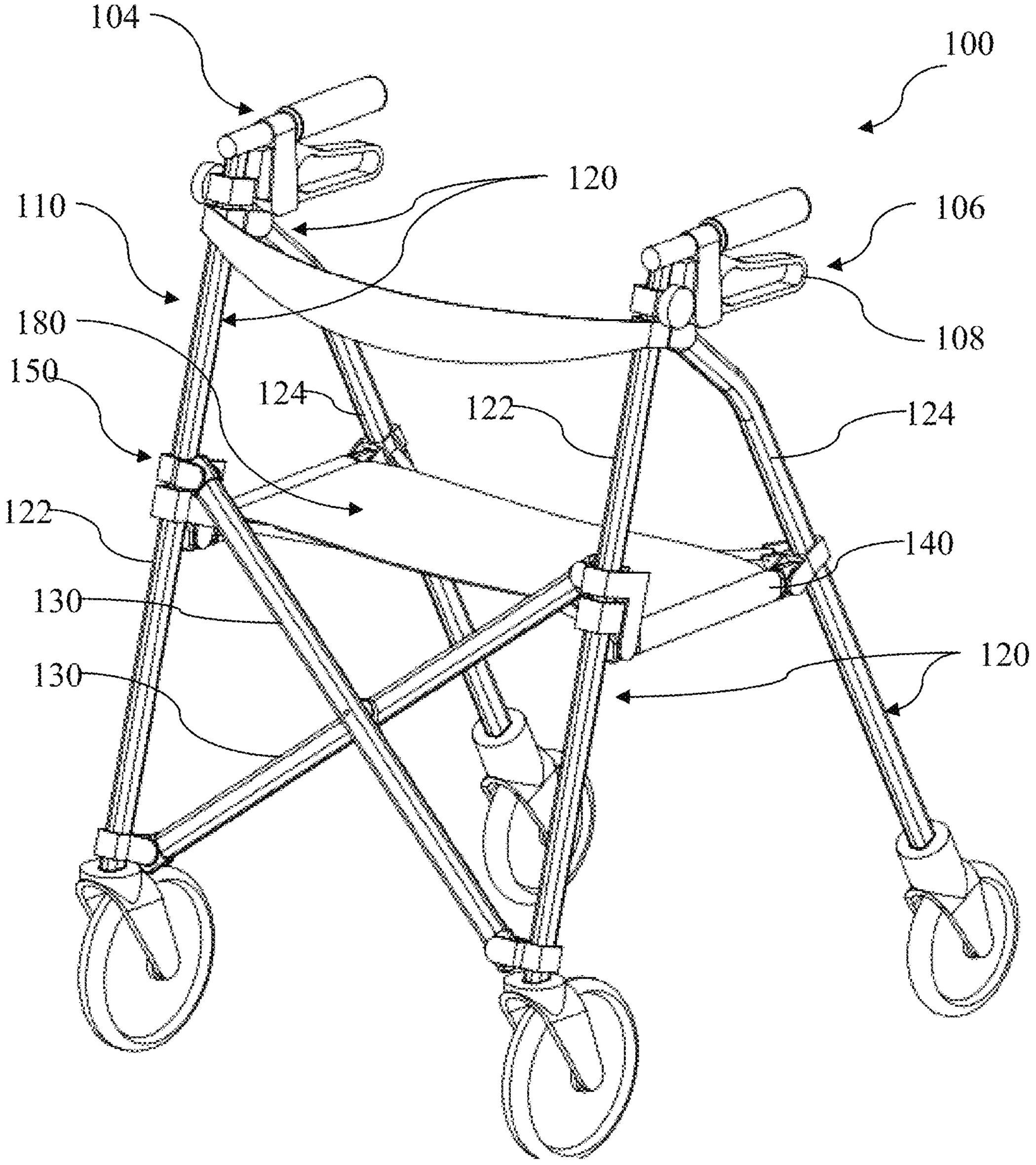
FIGS. 2A; 2B; 2C; 2D; and 2E show a perspective view; a front view; a right-side view; a top view; and a bottom view, respectively of the rollator frame in a schematic representation.
Figure 2B:
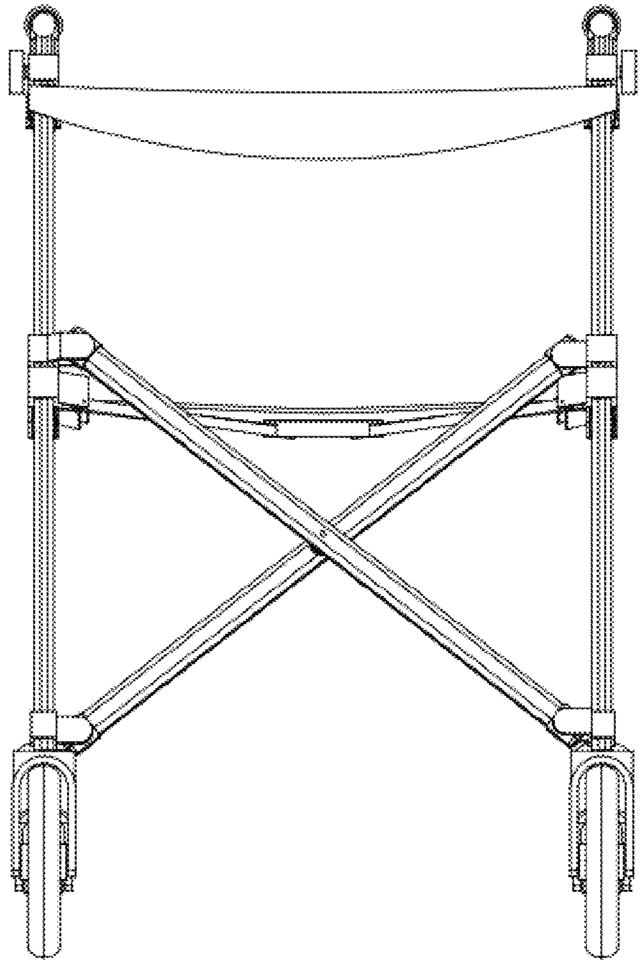
Figure 2C:
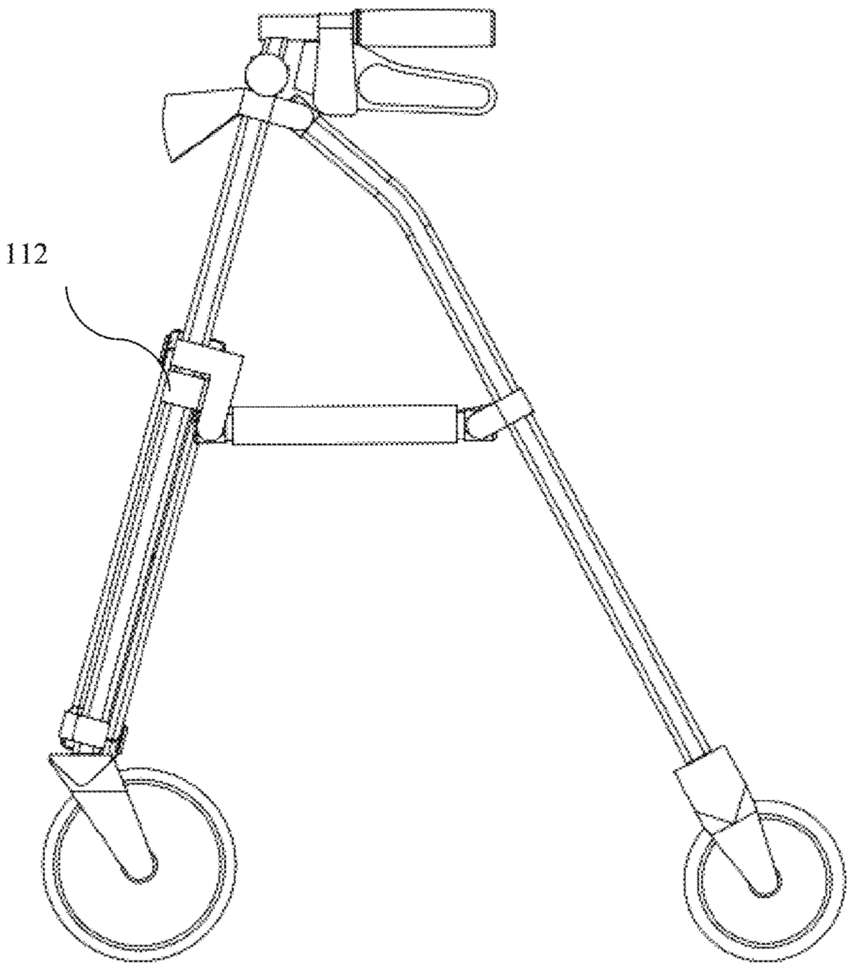
Figure 2D:
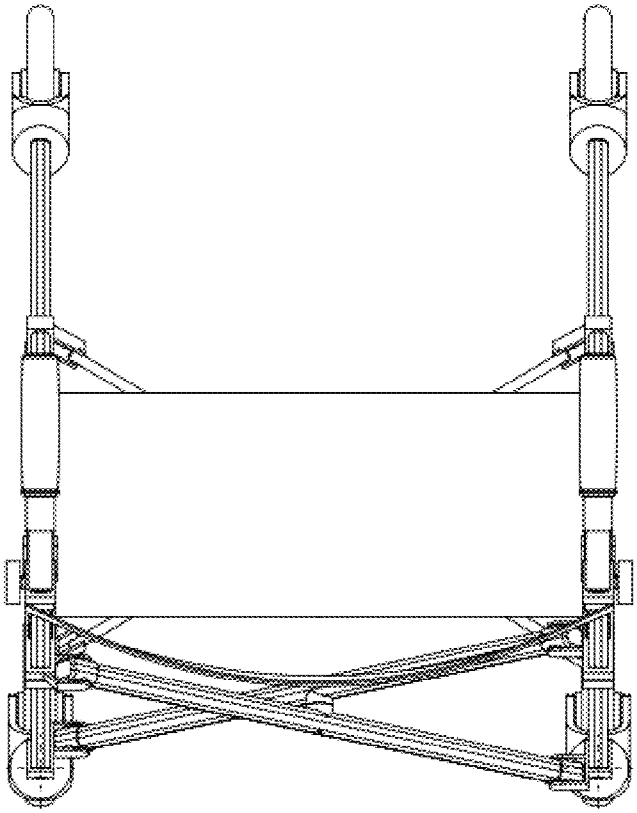
Figure 2E:
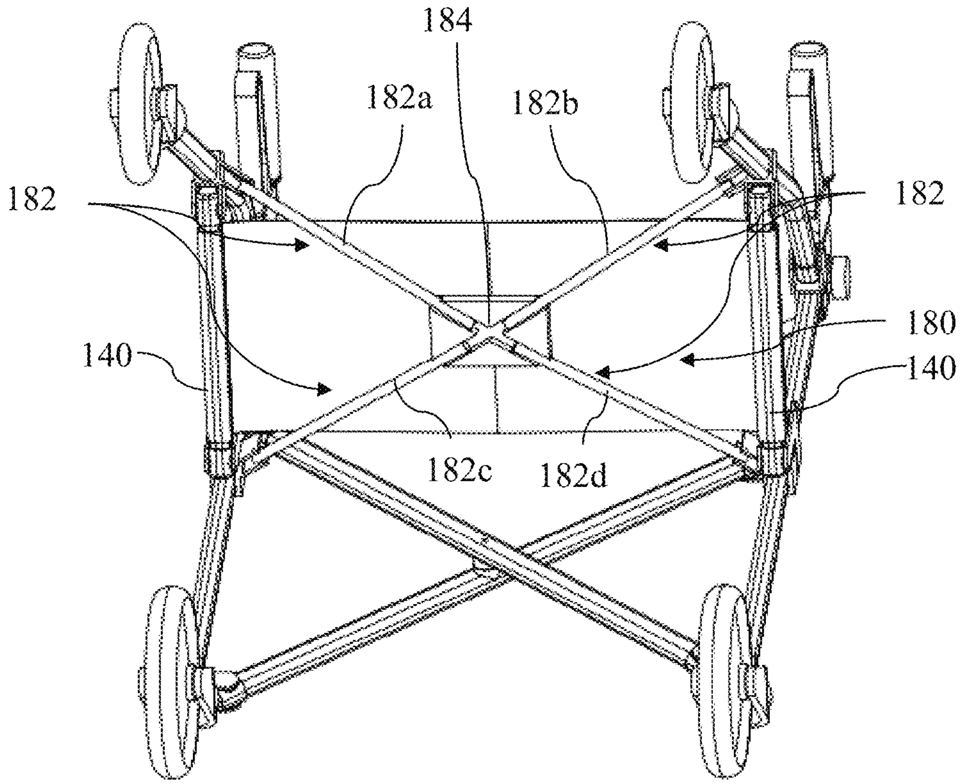
Figure 3A:
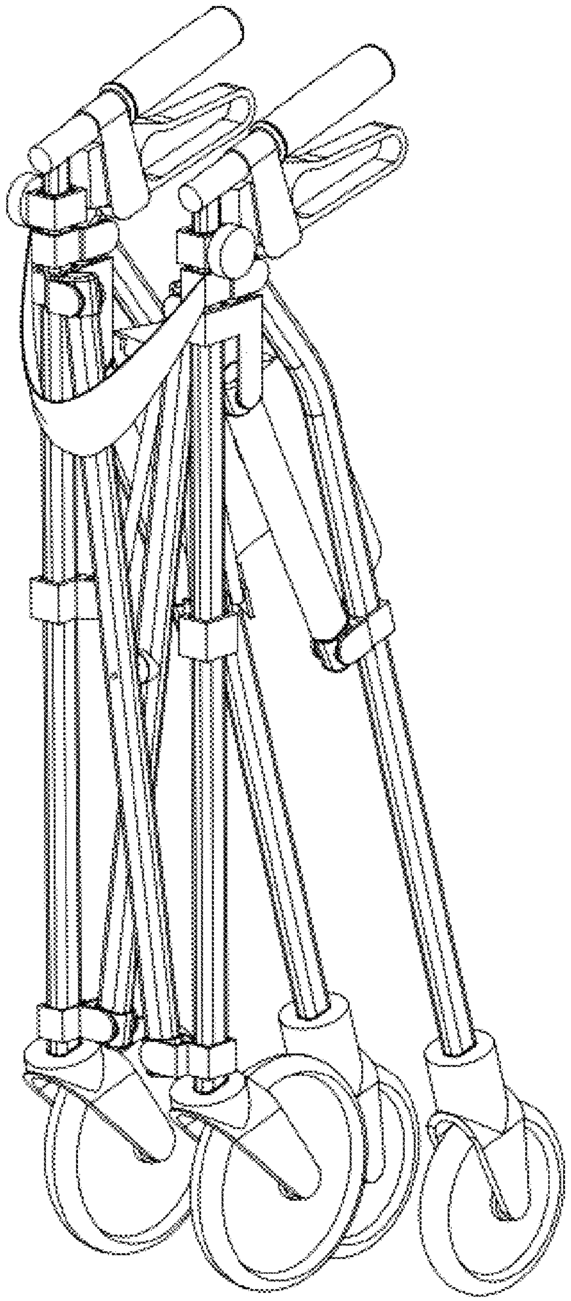
FIGS. 3A; 3B; 3C; and 3D show a perspective view; a front view; a right-side view; a top view, respectively of the rollator frame in the folded in a schematic representation.
Figure 3B:
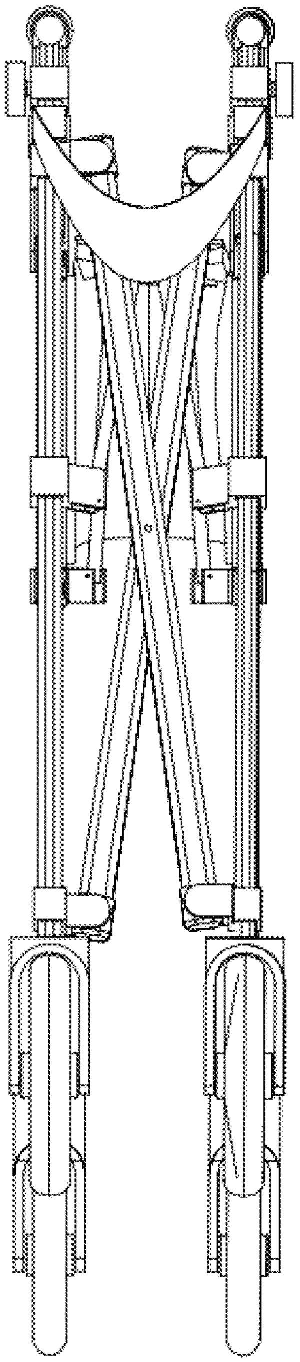
Figure 3C:
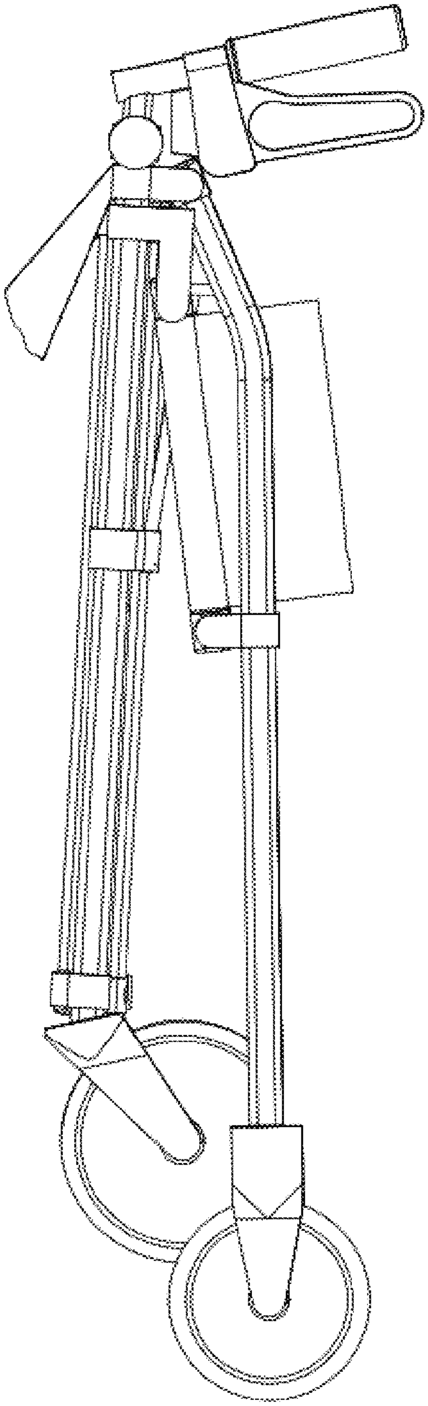
Figure 3D:
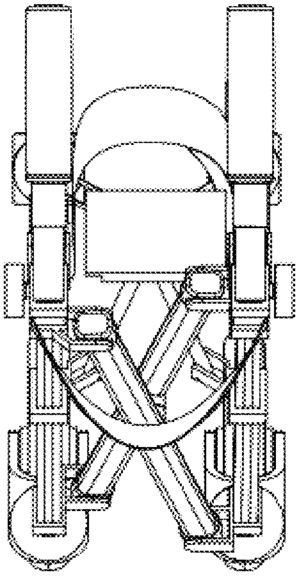
Figure 4A:
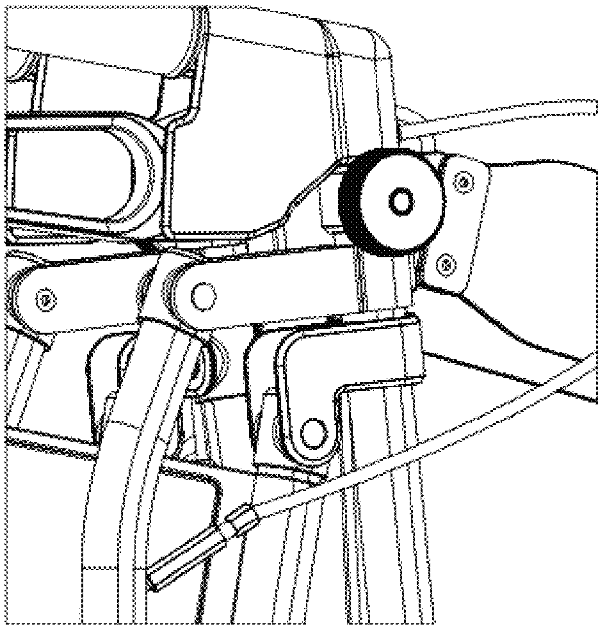
FIGS. 4A and 4B show zoomed in perspective views of the rollator handle and handle section of the frame in folded and unfolded configuration, respectively.
Figure 4B:
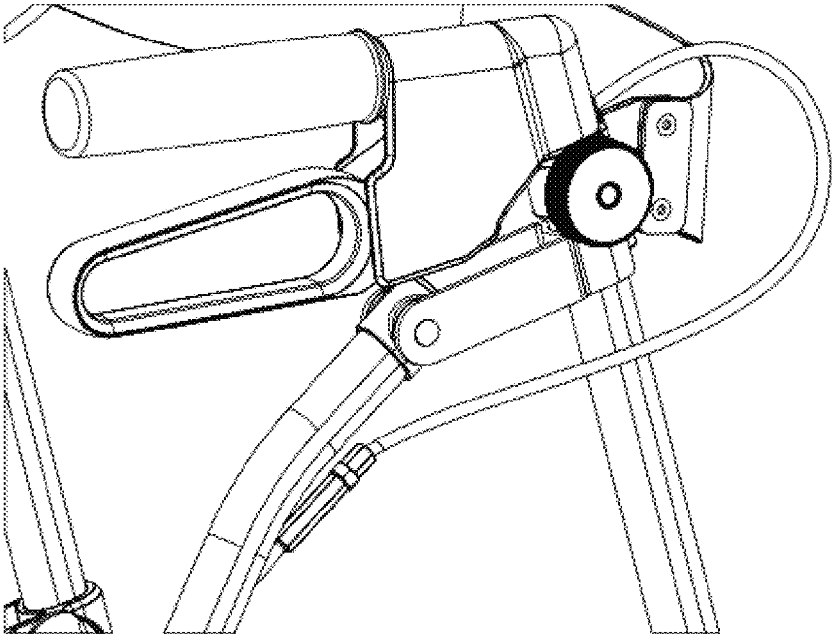
Figure 4C:
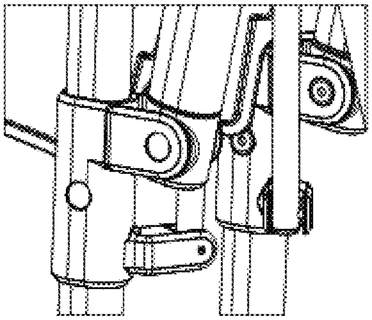
FIGS. 4C and 4D show zoomed in outer-side perspective views of the rollator seat and seat section of the frame in a folded and unfolded configuration, respectively.
Figure 4D:
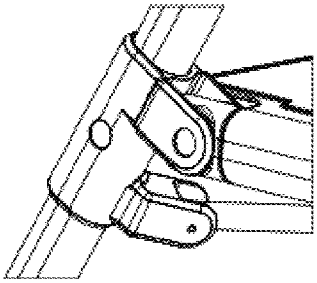
Figure 4E:
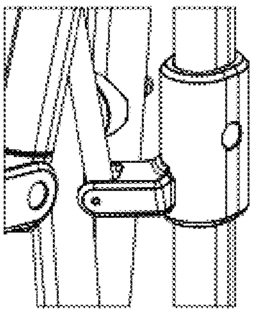
FIGS. 4E and 4F show zoomed in inner-side perspective views of the rollator seat and seat section of the frame in a folded and unfolded configuration, respectively.
Figure 4F:
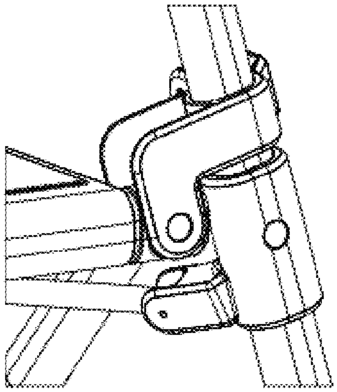
Figure 4G:
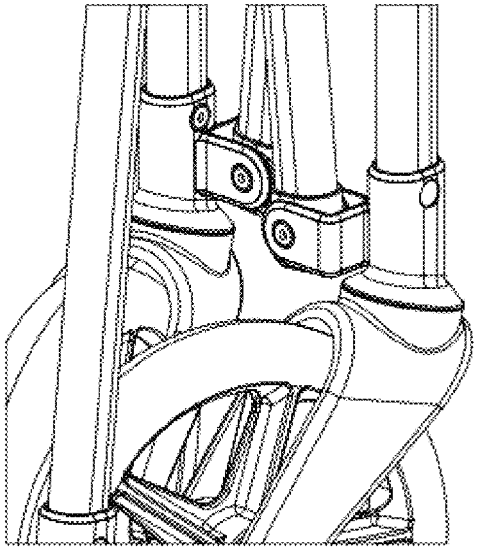
FIGS. 4G and 4H show zoomed in side perspective views of the rollator front wheel and front wheel section of the frame in a folded and unfolded configurations, respectively.
Figure 4H:
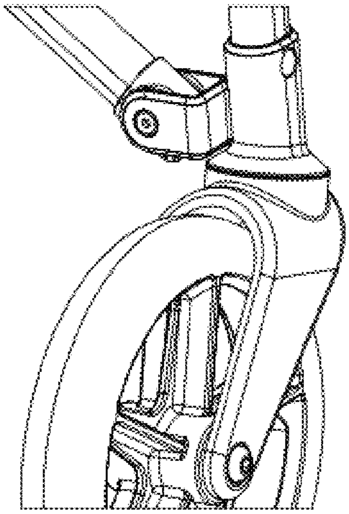

As is best seen in FIG. 2E, seat 180 comprises a cross-linkage 182, which is shown as an X-shaped cross-linkage. This X-shaped cross-linkage comprises four linkage members 182*a*, 182*b*, 182*c*, 182*d*, each of which extend from a respective upright 122, 124 to a central hub 184 underneath seat 180. When linkage members 182*a*, 182*b*, 182*c*, 182*d* are disposed in central hub 184 they are at or below centre. The cross-linkage 182 folds or pivots at the central hub 184 in both front-to back and side-to-side dimensions when the rollator 100 is folded away. This folding can be observed by comparing the diagrams in FIGS. 2, which show rollator 100 in the unfolded configuration to the diagrams in FIGS. 3, which show rollator 100 in the folded configuration. The pairs of FIGS. 4A and 4B; 4C and 4D; 4E and 4F; and 4G and 4H; also allow a comparison of the folded (4A; 4C; 4E; and 4G) and unfolded configurations (4B; 4D; 4F; and 4H).

In the embodiment shown in the Figures, folding is operated with actuator 190 which comprises a release 192 on the rollator seat 180. The folding is operated by pulling the release 192 in one direction, upwardly. When release 192 is operated, the linkage members 182*a*, 182*b*, 182*c*, 182*d* are lifted and/or removed or partially removed from central hub 184 to allow folding. When the linkage members 182*a*, 182*b*, 182*c*, 182*d* are removed or partially removed from the central hub 184 they may be lifted above centre. When the release 192 is operated, the movement may allow one action folding.

In the embodiment shown, release 192 is disposed on rollator seat 180. In other embodiments, release 192 may be disposed on rollator handle 104.

While in the embodiment shown in the Figures, the folding is actuated by a pulling motion, in other embodiments the folding may be actuated by a pushing motion. Advantageously, the folding is operated by pulling or pushing in one direction.

A-frame 110 further comprises front struts 130. In the embodiment shown in FIGS. 1; 2 and 3, the front struts 120 are provided in the form of two cross-struts which cross-over or intersect at or near their mid-point. Advantageously, the front struts 130 also fold or pivot relative to one another when the rollator 100 folds so the frame 110 folds side to side. The one or more front struts 130 are disposed on and extend between the two front uprights 122.

A-frame 110 also further comprises side struts 140. As shown in FIGS. 1; 2; and 3; the side struts 140 extend between a respective front upright 122 and a respective rear upright 124. The side struts 140 are shown to comprise a pair of side struts 140 which support seat 180.

Rollator A-frame 110 further comprises stoppers 112 which are fixed on the frame 110 to restrict movement of hinges 150 past a desired position for support of seat 180. The desired position may be horizontal to the ground.

With stoppers 112 positioned below hinges 150, frame 110 and/or front struts 130 will only fold up in the side to side folding. If stoppers 112 were placed above hinges 150, frame 110 and/or front struts 130 would only fold down in the folding. By positioning stoppers 112 below hinges 150, stoppers 112 provide additional structural support to the seat 180.

As is typical of rollators, rollator 100 also comprises four 102 wheels and handles 104 comprising hand grips 105.

Figure 5:
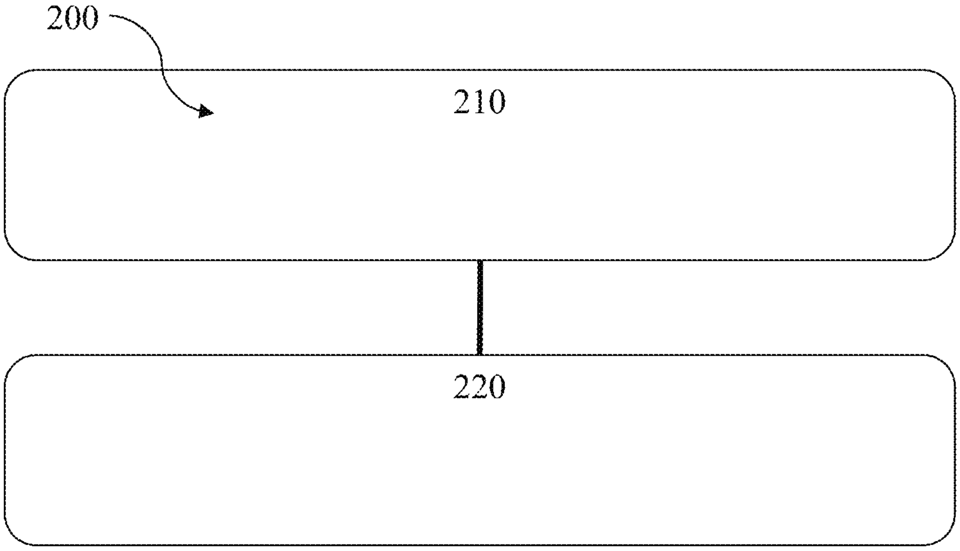
FIG. 5 is a chart showing the steps according to one embodiment of the invention.

As illustrated in FIG. 5 invention also provides a method 200 of manufacturing a rollator 100. Method 200 comprises constructing 210 an A-frame 110 comprising two pairs of uprights 120, each pair of uprights 120 connected by at least one respective hinge 150 to allow each pair of uprights 120 to be folded or pivot front-to-back. Method 200 also comprises disposing 220 a seat 180 between the two pairs of uprights 120, so that the seat 180 is foldable side-to-side.

The A-frame 110 may be manufactured from aluminium or other suitably strong and light weight material.

Rollator 100 also comprises a brake 106 which is operated by brake handles 108 disposed near handle 104. In other embodiments, brake 106 may comprise a button or lever instead of handles 108 and/or the brake handle 106, button or lever may be disposed at or near wheels 102.

Although not shown, rollator 100 may further comprise one or more storage components (not shown). The one or more storage components may be disposed on handles 104, on frame 110 and/or under the seat 180.

In this specification, the terms "comprises", "comprising" or similar terms are intended to mean a non-exclusive inclusion, such that an apparatus that comprises a list of elements does not include those elements solely, but may well include other elements not listed.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A rollator comprising:

an A-frame with two pairs of uprights, each pair of uprights connected by at least one respective hinge to allow each pair of uprights to be folded or pivot front-to-back; and a seat disposed between the two pairs of uprights, the seat foldable side-to-side wherein the rollator comprises an X-shaped cross-linkage comprising four linkage members and the four linkage members extend from a respective upright to a central hub underneath the seat.

2. A method of manufacturing a rollator comprising:

constructing an A-frame comprising two pairs of uprights, each pair of uprights connected by at least one respective hinge to allow each pair of uprights to be folded or pivot front-to-back; and disposing a seat between the two pairs of uprights, so that the seat is foldable side-to-side to thereby manufacture the rollator;

wherein the rollator comprises an X-shaped cross-linkage comprising four linkage members and the four linkage members extend from a respective upright to a central hub underneath the seat.

3. The rollator of claim 1, wherein the cross-linkage supports the seat.

4. The rollator of claim 1, wherein the cross-linkage folds or pivots at the central hub in both front-to back and side-to-side dimensions when the rollator is folded away.

5. The rollator of claim 1, wherein each pair of uprights comprises a front upright and a rear upright.

6. The rollator of claim 1, wherein the A-frame comprises four uprights.

7. The rollator of claim 6, wherein a front pair of uprights are straight and the rear pair of uprights comprise an angled section.

8. The rollator of claim 1, wherein the A-frame further comprises one or more front struts.

9. The rollator of claim 8, wherein the one or more front struts comprise two or more cross-struts.

10. The rollator of claim 9, wherein the two or more cross-struts comprise two cross-struts which cross-over or intersect at or near their mid-point.

11. The rollator according to claim 10, wherein the two or more cross-struts fold or pivot relative to one another when the rollator folds.

12. The rollator of claim 1, wherein the A-frame further comprises one or more side struts which extend between a respective front upright and a respective rear upright.

13. The rollator of claim 12, wherein the one or more side struts comprise a pair of side struts which support the seat.

14. The rollator of claim 1, wherein the hinges comprise a pair of hinges, with a hinge of the pair disposed on each pair of uprights.

15. The rollator of claim 14, wherein each hinge of the pair of hinges operates to fold the rollator front to back.

16. The rollator of claim 1, wherein folding is operated by an actuator comprising one or more release which when operated removes or partially removes the linkage members from the central hub to allow folding.

17. The rollator of claim 1, wherein the rollator frame further comprises one or more stopper.

18. The rollator of claim 1, wherein the rollator comprises one or more wheels; handles; or brakes.

* * * * *